Patented Sept. 21, 1937

2,093,947

UNITED STATES PATENT OFFICE 2,093,947

SULFAMIDES

Otto Albrecht, Basel, Switzerland, assignor to firm of Society of Chemical Industry in Basle, Basel, Switzerland.

No Drawing. Application November 7, 1935, Serial No. 48,787. In Switzerland November 7, 1934

2 Claims. (Cl. 260—128)

The present invention relates to new sulfamides of the benzene series which are valuable as assistants in the textile industry, particularly as mercerizing agents.

These new sulfamides correspond to the general formula

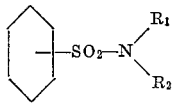

in which the benzene radical is substituted by at least one alkyl radical, in which further the total number of carbon atoms of the alkyls linked directly to the benzene nucleus amounts to at least three, in which further $R_1$ stands for hydrogen or an alkyl radical, and $R_2$ stands for a radical containing at least one OH-group.

These new sulfamides, which represent colorless to lightly colored oily or solid masses soluble in ethyl alcohol, are capable of considerably reducing the surface tension of mercerizing solutions, if desired in admixture with promoters of dissolution, for instance phenols or sulfonation products stable to alkali from fats or fatty substances, organic solvents and agents preventing foaming.

The new sulfamides may be made from the corresponding sulfochlorides in the usual manner by reaction with ammonia or amines, particularly hydroxyamines. If the reaction has been carried out with ammonia and amines which contain no OH-groups, the OH-groups are introduced in known manner into the sulfamide group. For example, sulfamides containing at least one free hydrogen atom connected with the nitrogen atom may be condensed with formaldehyde to methylol compounds, or may be caused to react with halogen hydrins. The necessary sulfochlorides may generally be obtained directly with chloro-sulfonic acid from the hydrocarbons and their derivatives, for example, from cymene or sulfite turpentine oil. In the latter case there are obtained mixtures which are also valuable as such.

As sulfamides corresponding to the above explained general formula there may be named such sulfamides which derive from cumene, cymene, butylbenzene, or chlorocymene, and the like.

The new sulfamides which are characterized by their easy solubility are obtained from the above named sulfochlorides or from amines containing hydroxy-groups, such as amines of the sugar series, such as glucamine, further amino-phenols, such as meta-aminophenol, N-mono-hydroxy-ethyl-meta-aminophenol, further hydrogenated aminophenols, such as hexahydrometa-aminophenol, $\beta$-hydroxy-$\alpha$, $\alpha$, $\alpha'$, $\alpha'$-tetramethyl-pyrrolidine, mono-ethanolamine, monopropanolamine, diethanolamine, N-ethyl-ethanolamine, dihydroxypropylamine, and the like. There may also be used the methylol compounds obtainable from sulfamides containing still a hydrogen atom with formaldehyde. The alkyl groups can also be contained in substituents, for example in amino- or hydroxy-groups. Such products are, for example, butylaniline-hydroxyethyl-sulfamide or the propyl ether of phenol-hydroxyethyl-sulfamide.

As promoters of dissolution, which if desired may be used together with the sulfamides, may be named, for example, phenols, cresols, xylenols and their derivatives, for instance halogen phenols; also sulfonation products of fats and fatty bodies which are stable to alkali, such as are obtainable for example by intensive sulfonation or by sulfonation in presence of sulfophthalic acid anhydride. Again, alkali-stable condensation products of the nature of the Twitchell reagent, obtainable for example from unsaturated fatty acids on the one hand and from aromatic hydrocarbons, phenols and the like on the other hand with the aid of sulfonating agents, may be added to the mercerizing liquor together with the sulfamide of the benzene series. As is known, the above mentioned Twitchell reagent is obtained by the addition of an aromatic hydrocarbon or a phenol to the double bond of the unsaturated fatty acid, the addition product being sulfonated at the same time. Mono- and polyhydric alcohols or ketones which are soluble in mercerizing liquors may also be used for increasing the solubility of the sulfamide. It may be advantageous for the purpose of increasing the wetting capacity of the mercerizing liquor to add as an addition to the aforesaid auxiliaries organic solvents, such as aliphatic, aliphatic-aromatic or hydro-aromatic alcohols, for example butyl, amyl or hexyl alcohol, methylcyclo hexanol, benzyl alcohol, terpene alcohols (pine oil), glycerin or ethers, for example glycol-mono-butyl ether, diethylene-glycol-mono-butyl ether and the like. For preventing foaming aliphatic hydrocarbons or alcohols of high molecular weight, for example those having 8–12 carbon atoms, may be added to the mercerizing liquor.

The aforesaid auxiliaries may be used alone or after previous admixture. It is particularly advantageous to dissolve the sulfamide of the benzene series and, if desired, the promoter of solubility, in a solution of an alkali hydroxide and to add the preparation thus obtained, if desired after addition of an organic solvent or a substance preventing foam formation, to the mercerizing liquor.

The aforesaid sulfamides of the benzene series impart to the mercerization liquor a wetting capacity, such that it is possible to mercerize directly raw cotton which has not been kier-boiled.

The following examples illustrate the invention, the parts being by weight:—

Example 1

Crude cymene is added gradually, drop by drop to 4 times its weight of chlorosulfonic acid while intensively cooling and stirring. Stirring is continued for some time at a low temperature and the mixture then poured upon ice. The acid chloride is dissolved in an organic solvent, for instance benzene, washed with cold water and separated from the solvent by distillation. 20 parts of the oily sulfochloride thus obtained are gradually added, by drops, while stirring at 0-5° C., to a solution of 10.6 parts of mono-ethanolamine in 10.6 parts of water. Stirring is continued for some time while cooling and the oily mono-hydroxyethylsulfamide is washed with water; it is soluble in mercerizing liquors. The new product dissolving easily in alcohol corresponds to the formula

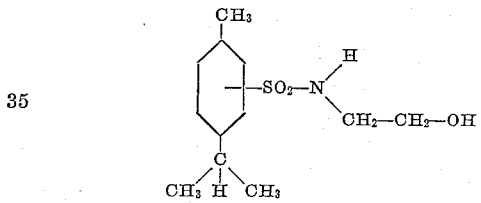

and consists of a mixture of the two possible isomers.

The other sulfamides which form the subject-matter of the present invention are obtained by suitably amending the above data and using the parent materials named in the introduction.

For mercerizing dry, unfinished thread there is used a mercerizing liquor (sodium hydroxide solution of 23.5 per cent. strength) which contains 1 part per thousand of the mono-hydroxyethyl-sulfamide, obtainable from crude cymene (sulfite turpentine oil). With the use of this auxiliary the mercerizing process is very rapid.

Example 2

26.6 parts of cymene-sulfamide are dissolved in 22.2 parts of caustic soda solution of 29.2 per cent. strength with addition of 3 parts of water, and heated to 50-55° C. At this temperature there are introduced, drop by drop, in the course of about 6 hours while stirring, 12 parts of ethylene-chlorohydrin. The reaction mixture is further stirred for about 9 hours at the indicated temperature, whereupon it is allowed to cool and acidified. When washed with water the N-hydroxyethyl - cymene - sulfamide represents a thick oil which can be used similarly as described in the previous example. Also the sulfamides of the other benzene hydrocarbons named in the introduction may be caused to react in analogous manner with hydroxyalkyl-halides, such as ethylene-chlorohydrin, glycerin-monochlorohydrin and the like. In that case there is for example obtained the N-dihydroxypropyl-cymene-sulfamide of the formula

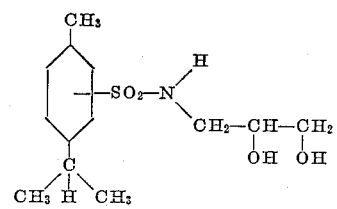

which forms a colorless oil easily soluble in alcohol. It is also capable of reducing the surface tension of the mercerizing liquors.

What I claim is:—

1. The sulfamides of the general formula

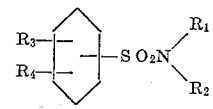

wherein $R_1$ stands for a member of the group consisting of hydrogen, lower alkyl and lower alkylol, $R_2$ stands for lower alkylol, $R_3$ stands for a member of the group consisting of hydrogen and methyl, and $R_4$ stands for lower alkyl, and wherein the total number of carbon atoms of the alkyls linked directly to the benzene nucleus amounts to at least three, which products represent lightly colored oily or solid masses soluble in ethyl alcohol and capable of considerably reducing the surface tension of mercerizing liquors when added thereto in small quantities.

2. The sulfamide of the formula

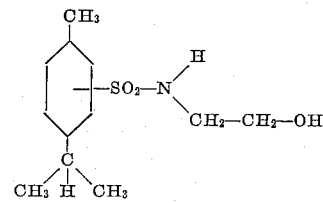

which represents a thick oil soluble in alcohol and capable of considerably reducing the surface tension of mercerizing liquors when added thereto in small quantities.

OTTO ALBRECHT.